United States Patent
Thomas et al.

(10) Patent No.: US 8,377,282 B2
(45) Date of Patent: Feb. 19, 2013

(54) DEVICE AND A METHOD FOR APPLYING A COATING ON A WORKPIECE BY ELECTRODEPOSITION

(75) Inventors: Jean-Louis Thomas, Honfleur (FR); Alain Le Cleac'h, Chavigny Bailleuil (FR)

(73) Assignee: SNECMA, Paris (FR)

( * ) Notice: Subject to any disclaimer, the term of this patent is extended or adjusted under 35 U.S.C. 154(b) by 470 days.

(21) Appl. No.: 12/546,246

(22) Filed: Aug. 24, 2009

(65) Prior Publication Data

US 2010/0044238 A1  Feb. 25, 2010

(30) Foreign Application Priority Data

Aug. 25, 2008 (FR) ..................................... 08 55696

(51) Int. Cl.
*C25D 5/00*  (2006.01)
(52) U.S. Cl. ....................................................... 205/143
(58) Field of Classification Search ................... 205/143
See application file for complete search history.

(56) References Cited

U.S. PATENT DOCUMENTS

| | | | | |
|---|---|---|---|---|
| 1,672,402 A | * | 6/1928 | Armstrong | .................... 204/216 |
| 1,920,209 A | * | 8/1933 | Norton | ............................. 82/117 |
| 3,022,232 A | | 2/1962 | Bailey et al. | |
| 3,989,602 A | * | 11/1976 | McCandless et al. | ......... 205/114 |
| 4,120,994 A | * | 10/1978 | Inoue | .............................. 427/239 |
| 6,409,902 B1 | * | 6/2002 | Yang et al. | ....................... 205/70 |
| 2002/0084190 A1 | | 7/2002 | Ewald et al. | |
| 2004/0089554 A1 | * | 5/2004 | Schepel et al. | ................. 205/137 |

FOREIGN PATENT DOCUMENTS

| | | | |
|---|---|---|---|
| DE | 2550952 | | 5/1977 |
| JP | 61061672 A | * | 3/1986 |
| JP | 08269778 A | * | 10/1996 |

* cited by examiner

*Primary Examiner* — Edna Wong

(74) *Attorney, Agent, or Firm* — Preti Flaherty Beliveau & Pachios LLP

(57) ABSTRACT

The invention relates to a device and a method of applying a coating on a workpiece by electrodeposition. In the method, a workpiece is mounted on the mandrel of a lathe. A vessel, connected to a current generator and containing a bath of electrolyte and a conductor forming an anode, is placed beneath the workpiece. All or part of the workpiece is immersed in the bath by moving the vessel into a first position. The workpiece is turned by the lathe so that the entire surface of the workpiece is immersed at least once in the bath while a material is electrodeposited on the workpiece. The vessel is moved into a second position to break contact between the workpiece and the bath of electrolyte.

9 Claims, 2 Drawing Sheets

DEVICE AND A METHOD FOR APPLYING A COATING ON A WORKPIECE BY ELECTRODEPOSITION

FIELD OF THE INVENTION

The present invention relates to a device and to a method for applying a coating on a workpiece by electrodeposition.

BACKGROUND OF THE INVENTION

The usual methods of depositing a metal coating on a workpiece consist in immersing said workpiece in a vessel that contains a bath of electrolyte together with electrode panels. Those methods, also referred to as in situ electrodeposition methods, present drawbacks in terms of duration and quality. Because of corner effects associated with the electric field, the deposit builds up faster at the ends of the workpiece. In order to obtain a coating that is uniform, it is therefore necessary to perform a plurality of deposition operations in succession, and interrupt them with stages of machining in order to remove the irregularities progressively. The workpiece is inserted a first time in the vessel containing the bath of electrolyte in order to receive a first deposit, then it is withdrawn from the vessel and mounted on the mandrel of a lathe so as to be machined. It is then introduced a second time in the bath of electrolyte to receive a second deposit, and the stages of deposition and of machining are thus repeated in alternation until a satisfactory coating is obtained. Methods using direct current (DC) baths generally require four to six passes, thereby giving rise to a significant loss of time and to large costs. One known solution for improving the uniformity of the deposit consists in using an alternating current (AC) bath. That technique requires only a limited number of passes and enables a deposit to be obtained that is more uniform, but it does not avoid the need for the machining stage. In addition, it gives rise to problems associated with geometry and with keeping the chemistry of the bath constant.

Another major drawback of known electrodeposition methods is the need to regenerate the bath of electrolyte regularly. In the initial bath, the concentration of ions available for electrolysis decreases as a result of the cathode reaction of deposition on the workpiece. A commonly used solution for keeping the concentration of said ions constant is referred to as "blending" the bath and consists in periodically removing a volume fraction from the bath and replacing it with an equivalent fraction of concentrated new bath. That solution remains laborious. A solution that enables the electrolytes to be regenerated continuously without external intervention is known from French patent FR 2 821 627. That document describes a method of electrodepositing nickel on a workpiece, the method involving a vessel containing a conductor material fastened to one of the end faces of the vessel and forming an anode, with a sufficient quantity of nickel beads for maintaining permanent contact with said material. The cathode-forming workpiece that is to be covered in nickel is situated under said vessel. Continuously regenerated by the nickel beads, the electrolyte comes by gravity into contact with the workpiece and is recovered below so as to be reintroduced into the vessel. That method which takes place "outside" the vessel, nevertheless does not reduce the length of time required for the mounting/removal operations prior to each stage of deposition or of machining, whenever a plurality of passes are needed.

OBJECT AND SUMMARY OF THE INVENTION

The present invention thus seeks to simplify the electrodeposition method, and to reduce its costs, by reducing the handling needed for obtaining a product that is uniform and of good quality, and also by reducing the duration of each pass.

More particularly, in a first aspect, the present invention provides an electrodeposition device for performing electrodeposition on a workpiece, the device comprising a vessel suitable for being filled with a bath of electrolyte, anode-forming conductor means placed in the vessel and connected to a current generator, a cathode-forming workpiece mounted on the mandrel of a lathe, and guidance and movement means for guiding and moving the vessel relative to the lathe between a first position enabling the workpiece to be immersed in full or in part in the bath of electrolyte, and a second position enabling the workpiece to be machined.

In an advantageous disposition, the device includes at least a piece of metal for deposition that is suitable for remaining in permanent contact with the conductor means during electrodeposition. Preferably, it contains a set of metal beads made of the metal for deposition, placed in the vessel, and kept permanently in contact with the conductor means under the effect of gravity. For example, the metal for deposition is nickel.

According to another advantageous disposition, the vessel containing the bath of electrolyte includes forced circulation means for circulating the bath of electrolyte inside the vessel.

In particular, the conductor means may include a portion of a shape that corresponds to the outer longitudinal profile of the workpiece and this portion is placed in the vessel so as to face the workpiece in the first position. In this way, the distance between the surface of the cathode-forming workpiece and the anode-forming conductor means is kept constant and the deposition takes place in a manner that is more uniform.

Advantageously, the vessel further includes accurate guidance means enabling it to be moved vertically so as to conserve a constant distance between the cathode-forming workpiece and the conductor means during electrodeposition, thereby enabling the uniformity of the deposit to be further optimized.

In particular, the device of the invention may be applied to a combustion chamber.

In a second aspect, the present invention provides an electrodeposition method of performing electrodeposition on a cathode-forming workpiece, the method consisting in:

a) mounting the workpiece on the mandrel of a lathe;

b) placing beneath the workpiece a vessel containing a bath of electrolyte together with conductor means forming an anode and placed in the vessel connected to a current generator;

c) immersing all or part of the workpiece in said bath of electrolyte by moving the vessel into a first position;

d) causing the workpiece to be turned by the lathe so that the entire surface of the workpiece for coating is immersed at least once in the bath of electrolyte; and e) moving the vessel containing the bath of electrolyte into a second position, so as to break contact between the workpiece and the bath of electrolyte.

In an advantageous disposition, after step e), the method includes a step f) consisting in machining the workpiece on the lathe. In particular, the series of steps b) to f) may be implemented a plurality of times. It is thus possible to perform a plurality of successive passes without removing the workpiece from the mandrel of the lathe.

In another advantageous disposition, a set of beads made of the metal for deposition is put into permanent contact with the conductor means under the effect of gravity.

In order to enable the metal ions to disperse better in the bath of electrolyte, the bath may be put into forced circulation inside the vessel when the workpiece is immersed in full or in part therein.

The method may also include a step consisting in introducing water and/or electrolyte into the bath of electrolyte in order to compensate for losses due both to evaporation and to cathodic deposition.

Preferably, the vessel containing the bath of electrolyte is moved vertically during step d), such that a constant distance is conserved between the cathode-forming workpiece and the conductor means during electrodeposition.

Such dispositions enable the duration of the electrodeposition method to be reduced significantly. Since the workpiece is mounted on the mandrel of a lathe and is immersed in full or in part in a bath of electrolyte contained in a movable vessel when located in the first position, it is possible to perform the deposition and machining operations in succession without any intermediate removal of the workpiece. After a first deposition operation, the vessel is moved into the second position so that the workpiece is no longer in contact with the bath of electrolyte. Machining can then be performed without moving or mounting the workpiece beforehand on a lathe. After machining, the vessel is replaced in the first position under the workpiece and a second deposition operation is performed. These steps are repeated until a satisfactory coating is obtained. By avoiding the mounting and removal stages concerning the workpiece and the lathe between the deposition and machining operations, the method of the invention is faster than the methods known in the prior art.

Furthermore, great accuracy is achieved because, given that the workpiece remains mounted on the lathe throughout the duration of the method, there is no longer any need to re-set the reference thereof prior to each machining phase.

The particular shape of the conductor means, corresponding substantially to the shape of the workpiece that is to be coated, serves to avoid corner effects and to improve the uniformity of the deposit. Better uniformity is also achieved because of the fact that the precision guidance means maintain a constant distance between the two electrodes, thereby avoiding variations in the intensity of the field lines. Finally, mounting the workpiece on the mandrel of a lathe enables the workpiece to be rotated slowly during the electrodeposition method, such that its entire surface can be coated in uniform manner.

In addition to the above-described advantages, it is possible to further simplify the method by introducing a piece of the metal for deposition into the vessel containing the bath of electrolyte, which piece is put into permanent contact with the conductor means connected to the current generator. In this way, the electrolyte of the bath is continuously regenerated without external intervention and implementation of the method is thus facilitated.

BRIEF DESCRIPTION OF THE DRAWINGS

The invention can be better understood and other advantages thereof appear better in the light of the following description given purely by way of example and made with reference to the accompanying drawings, in which.

MORE DETAILED DESCRIPTION

Figure 1:
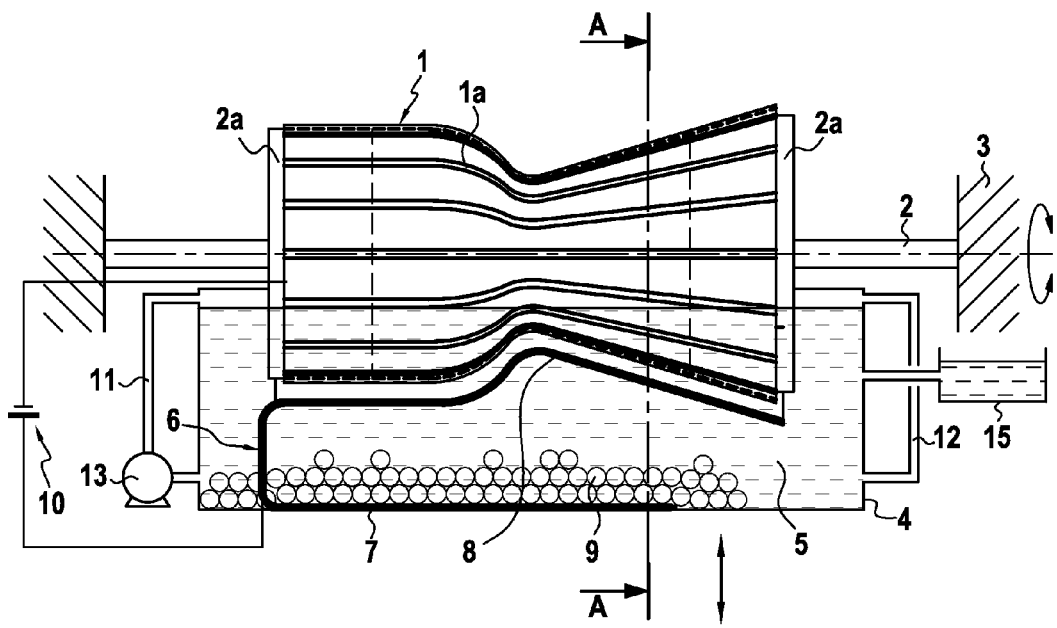
FIG. 1 is a longitudinal section view of the device of the present invention in a first embodiment.

FIG. 1 shows a first embodiment of the invention, applied to a workpiece that is constituted by a cryogenic rocket engine combustion chamber (referred to below as the "chamber"). This type of chamber 1 is in the form of an annular copper ingot having channels 1a referred to as "meridians" machined in the outer periphery thereof for the purpose of allowing hydrogen to flow. These channels 1a are filled with a specific wax, and the assembly is covered in a layer of nickel having a thickness of 2 millimeters (mm) to 3 mm. The chamber 1 is of an axially-symmetrical hourglass shape with a length of 600 centimeters (cm) to 700 cm. It comprises a first portion that is cylindrical with a diameter of about 50 cm and that is extended by a tapering second portion that is frustoconical with a maximum diameter that corresponds to the diameter of the cylindrical first portion. The chamber 1 also has a third portion that is frustoconical with a maximum diameter of about 70 cm to 80 cm and that flares away from the second portion. The description below relates to a device of the invention that enables said layer of nickel to be deposited by electrodeposition.

The chamber 1 is mounted centered on the mandrel 2 of a lathe 3 by means of two supports 2a in the form of bodies of revolution that are placed inside the chamber 1. In the vicinity of the chamber 1 there is placed a vessel 4 containing a bath of electrolyte 5. The vessel is associated with means for guiding it and moving it (not shown) that make it possible, after the chamber 1 has been mounted on the lathe 3, for the vessel to be moved reversibly under the chamber 1 so that at least a fraction of the surface of the chamber 1 extending over the entire length of the chamber along the axis of the mandrel 2 is immersed in the electrolyte bath 5. In this way, rotating the mandrel 2 of the lathe 3, and thus rotating the axially-symmetrical chamber 1 mounted on the mandrel, ensures that all of the outside surface of the chamber becomes immersed. It is clear that under such circumstances, a workpiece having a cross-section that is not circular (a workpiece that is not axially symmetrical) would require care to be taken to ensure that all of its zones for covering do indeed become immersed during rotation.

Conductor means 6 are placed in the vessel 4. They comprise a bottom portion 7 placed in the bottom of the vessel 4 and supporting a top portion 8 that is of a shape that corresponds at least approximately, but preferably accurately, to the outline of the chamber 1 along the axis of the mandrel. This top portion 8 situated facing the chamber 1. A substantially constant distance is thus maintained between the chamber 1 and the top portion 8 as a result of the similarity of their profiles, thus making it possible to avoid corner effects associated with the electric field and thereby to ensure that deposition takes place more uniformly. On the bottom portion 7 there are placed beads of nickel 9, at least some of which are in permanent contact with the bottom portion 7 of the conductor means 6 under the effect of gravity. The conductor means 6 are connected to the positive terminal of a current generator 10, thus forming an anode, while the combustion chamber 1 is connected to the negative terminal of the current generator, thereby forming the cathode. Under the effect of the potential difference exerted between the two electrodes, the nickel beads in contact with the anode become polarized and release $Ni^{2+}$ nickel ions that are suitable for picking up electrons present on the cathode-workpiece (chamber 1), thereby creating a deposit of solid nickel. Because of the beads of nickel, the concentration of ions in its bath of electrolyte remains constant, and unlike known methods, there is no need to continuously renew the electrolyte contained in the vessel.

The distance between the anode and the cathode decreases as the thickness of the deposit on the workpiece increases. In order to conserve a constant distance between the electrodes and to avoid variations in the intensity of the field lines, precision guidance means (not shown) are preferably provided that enable the vessel to be moved away vertically during the electrodeposition method.

A system is provided for circulating the bath of electrolyte in the vessel. By way of example, this system may be made up of two pipes 11 and 12, each connected to the bottom portion and to the top portion of a different side face of the vessel, together with a pump 13. The bath of electrolyte is thus subjected to forced circulation between the bottom of the vessel where the beads of nickel are located and the top of the vessel where the immersed portion of the chamber is located. This circulation serves to stir the electrolyte and to disperse the $Ni^{2+}$ nickel ions towards the workpiece that is to be covered.

A water tank 15 is also connected to the vessel 4 that contains the bath of electrolyte 5. This connection may be provided by a rigid duct, with the tank 15 then being constrained to move vertically with the vessel 4. Alternatively, the pipe may be flexible and the tank may remain stationary during the various steps of the method. Such means for feeding water to the vessel 4 serve to compensate for losses due in particular to evaporation, and to maintain a constant volume of electrolyte in the vessel 4.

Figure 2:
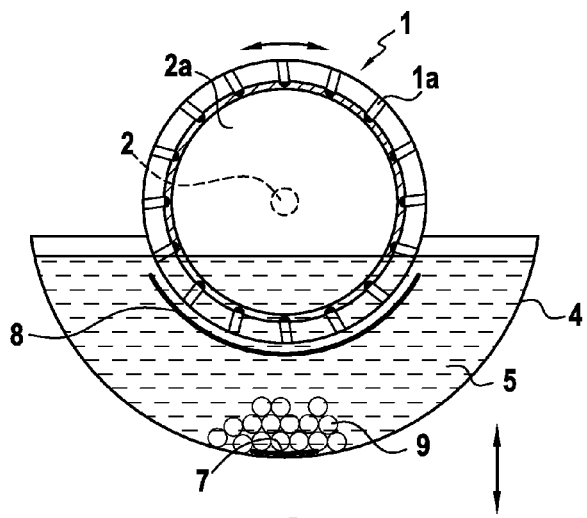
FIG. 2 is a cross-section view on line A-A showing the FIG. 1 device.

FIG. 2 is a cross-section view of the device of the invention. The vessel containing the bath of electrolyte is in the form of a half-shell that enables it to match the generally cylindrical and elongate shape of the chamber. Such a shape enables the volume of electrolyte needed to be diminished. For example, the vessel containing the bath of electrolyte may be semicylindrical in shape.

Further, if necessary, a gasket can be located between the mandrel 2 and the edge of the vessel 4 so as to provide sealing and to avoid any electrolyte flowing out from the vessel via the ends.

Figure 3:
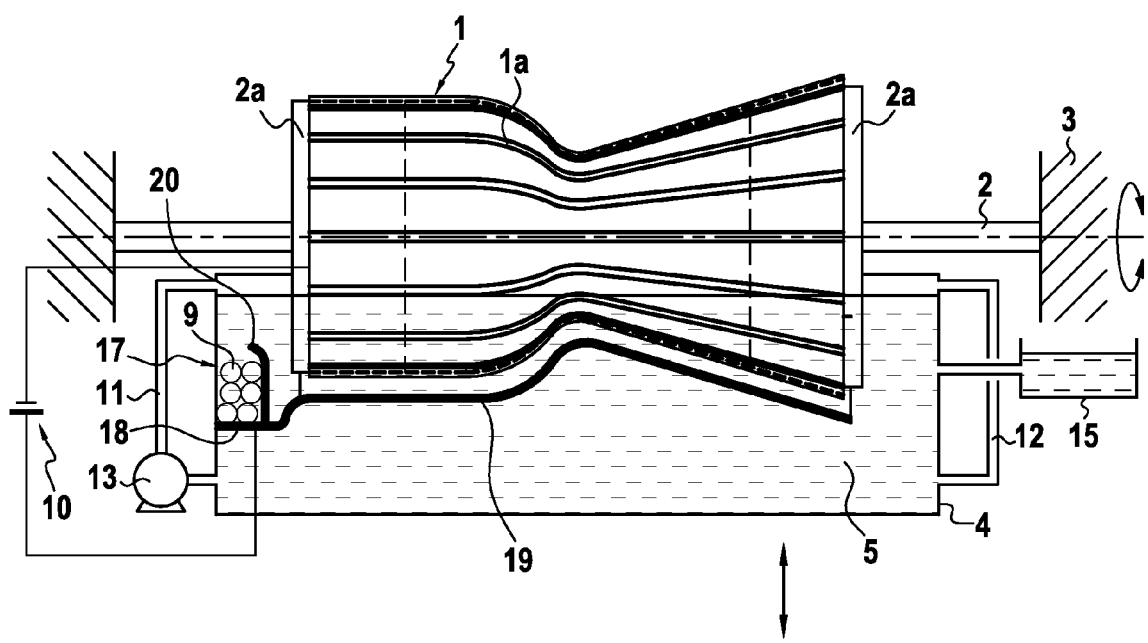
FIG. 3 is a longitudinal section view of the device of the present invention in a second embodiment.

FIG. 3 shows a second embodiment of the present invention. Elements that are common with the first embodiment retain their reference numerals in the description below.

A bracket 17 is fastened to one of the end walls of the vessel 4 (shown on the left in FIG. 3). It comprises a first portion 18 forming the bottom of the bracket, which portion is extended by a second portion 19 of shape similar to that of the chamber 1, and a third portion 20 connected to one or the other or both of the first and second portions. The bracket 17 forms an anode connected to the positive pole of a current generator. As in the above-described embodiment, the chamber 1 forming the cathode is connected to the negative terminal of said generator. The nickel beads 9 are retained in the vessel, in a housing defined by the end wall and the fraction of the bracket 17 that comprises the portions 20 and 18. In this way, the beads 9 may be kept in permanent contact with the first portion 18 of the bracket 17.

The method of using the device of the invention is described below in greater detail.

Initially, the combustion chamber 1 is mounted on the mandrel 2 of the lathe 3 with the help of the supports 2a. It is preferably axially symmetrical and centered on the axis of the mandrel 2. The vessel 4 is filled with the bath 5 of electrolyte and the anode-forming conductor means 6 are put into contact with the nickel beads 9 and connected to the positive terminal of the current generator 10. By means of suitable guidance and movement means, the vessel 4 is placed in the first position such that at least a portion of the chamber 1 is immersed in the bath of electrolyte. The workpiece is then set into slow rotation by the lathe. The generator produces DC, thereby polarizing the nickel beads via the conductor means 6. Electricity is then conveyed to the cathode (chamber 1) by the $Ni^{2+}$ ions which, on capturing electrons, enable nickel to be depositing on the surface of the chamber. Because of the particular shape of the top portion 8 of the conductor means 6, deposition takes place more uniformly than in prior art methods. Nevertheless, after each deposition operation it remains necessary to machine the chamber in order to eliminate irregularities. The vessel is thus subsequently withdrawn and placed in the second position by its guidance and movement means, and the workpiece is machined immediately on the lathe without being removed therefrom. Thereafter the vessel is replaced in the first position and a second deposit is made. As successive deposition operations take place, the accurate guidance means move the vessel and thus the anode in such a manner as to ensure that the distance between the anode and the cathode remains constant at all times.

Although the invention is described in the context of depositing nickel on the outside face of the workpiece, the method can be applied in the same manner to the inside surface of the workpiece. Under such circumstances, conductor means are used that have a portion of shape that corresponds to the longitudinal profile of the inside surface of the workpiece, said portion being placed inside the workpiece in the first position so as to face the portion of the workpiece that is to be covered.

In the context of the present invention, it is also possible to envisage an embodiment without metal beads, with a portion of the chamber 1 being immersed in the vessel 4 that is filled with a bath 5 of electrolyte that contains $Ni^{2+}$ nickel ions and that is provided with electrode panels. Such an embodiment is more constricting since, unlike the embodiment described above, it requires the electrolyte of the bath in which the chamber is immersed to be recharged regularly so as to maintain a constant concentration of ions.

What is claimed is:
1. An electrodeposition method of performing electrodeposition on a cathode-forming workpiece, wherein the method comprises:
   a) mounting the workpiece on the mandrel of a lathe;
   b) placing beneath the workpiece a vessel containing a bath of electrolyte together with a conductor forming an anode and placed in the vessel connected to a current generator;
   c) immersing all or part of the workpiece in said bath of electrolyte by moving the vessel into a first position;
   d) causing the workpiece to be turned by the lathe so that the entire surface of the workpiece for coating is immersed at least once in the bath of electrolyte while electrodepositing a material on the workpiece; and
   e) moving the vessel containing the bath of electrolyte into a second position, so as to break contact between the workpiece and the bath of electrolyte.

2. An electrodeposition method according to claim 1, including, after step e), a step f) comprising machining the workpiece on the lathe.

3. An electrodeposition method according to claim 2, wherein the series of steps b) to f) is implemented a plurality of times.

4. An electrodeposition method according to claim 1, wherein a set of beads made of a metal comprising the material for electrodeposition is put into permanent contact with the conductor under the effect of gravity.

5. An electrodeposition method according to claim 1, wherein the bath of electrolyte is put into forced circulation inside the vessel when the workpiece is immersed in full or in part in said bath.

6. An electrodeposition method according to claim 1, wherein water and/or electrolyte is introduced into the bath of electrolyte in order to compensate for losses.

7. An electrodeposition method according to claim 1, wherein the vessel containing the bath of electrolyte is moved vertically during step d), such that a constant distance is conserved between the cathode-forming workpiece and the conductor during electrodeposition.

8. An electrodeposition method according to claim 1, wherein the material electrodeposited on the workpiece is nickel.

9. An electrodeposition method according to claim 1, wherein the workpiece is a combustion chamber.

* * * * *